United States Patent Office 3,161,244
Patented Dec. 15, 1964

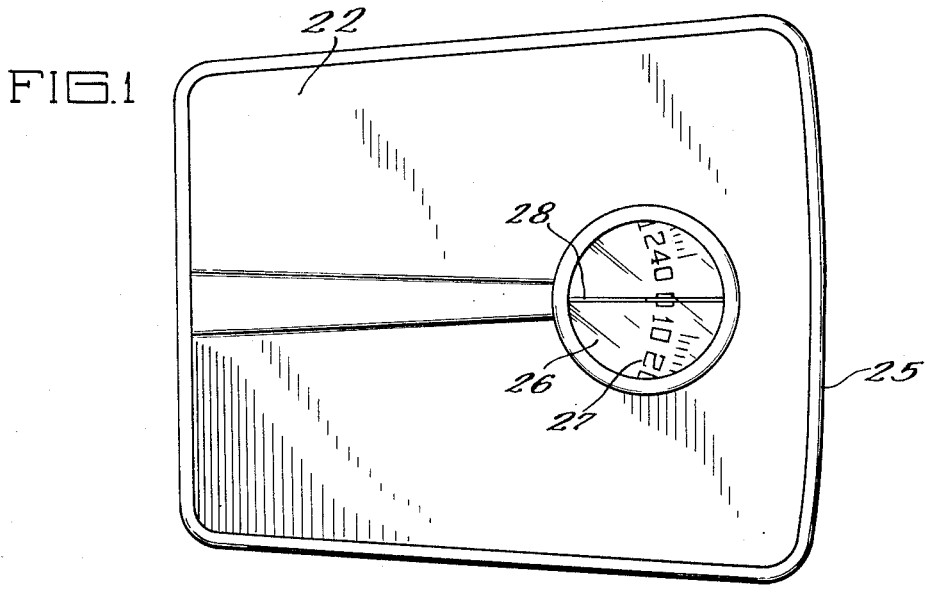
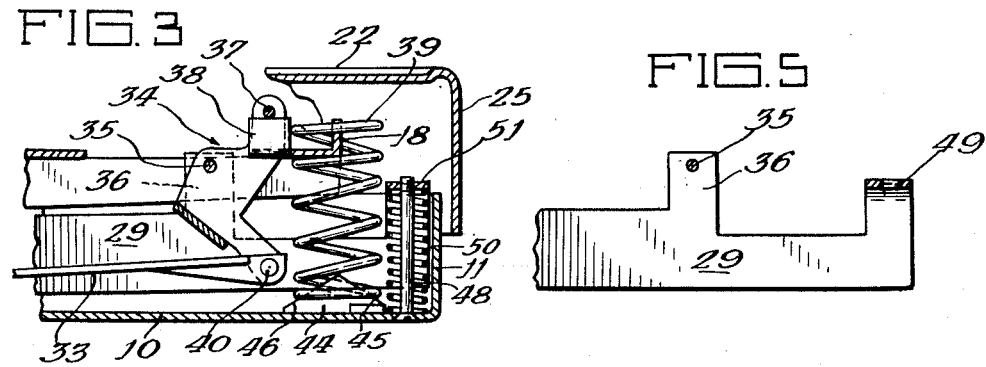
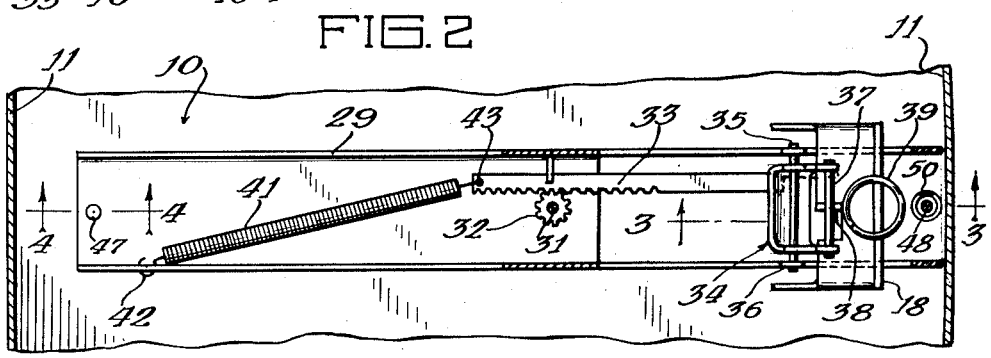
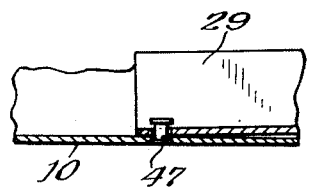

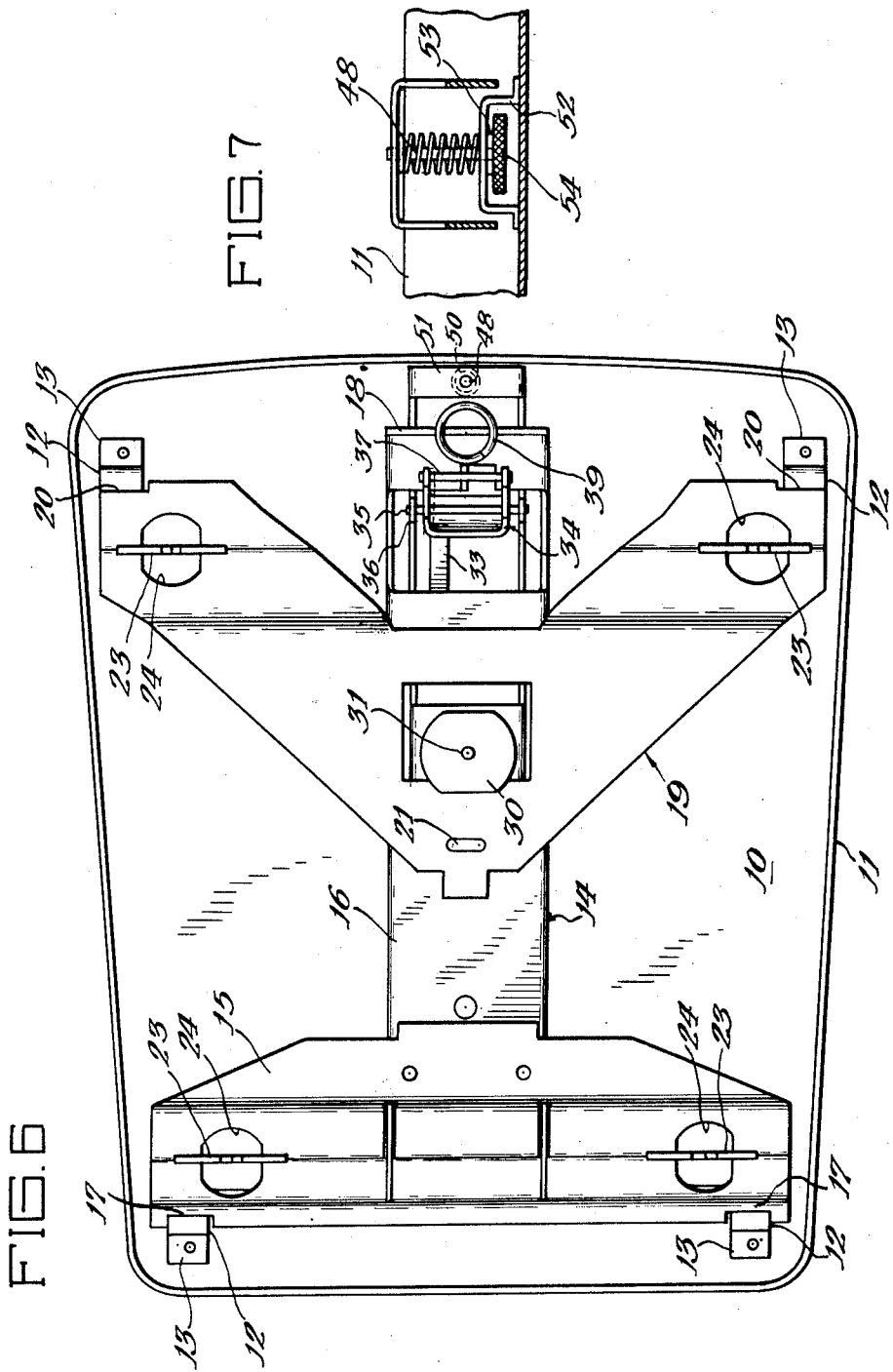

3,161,244
ZEROING DEVICE FOR BATHROOM TYPE SCALES
Stan B. Hanssen, Kenilworth, Ill., assignor to Hanson
Scale Company, a corporation of Illinois
Filed June 15, 1961, Ser. No. 117,407
5 Claims. (Cl. 177—173)

This invention relates to a platform scale of the bathroom type and more particularly to a novel zeroing device in such a scale for moving the indicator relative to a datum line.

Most bathroom scales now in use have cooperating levers which receive the weight of the person standing on the scale. The levers are permitted to deflect a given amount against a yielding counterbalancing means and an indicating mechanism moves proportionally to the deflection for visual indication of the magnitude of the weight.

Zeroing devices used on scales in the past have generally moved the levers relative to the sensing means in order to make the printed scale move to a zero position. Some scales in order to reduce weight and number of parts, have had no provision for moving the levers, thus having no provision for moving the scale to an initial zero setting. Such scales were set when manufactured and the customer owner of the scale could not make any adjustment. Applicant has provided a novel structure which moves the sensing means relative to the levers and maintains an accurate indicator during the normal life span of the scale while still avoiding the weight and numerous parts used in prior adjustable scales.

It is the principal object of this invention to provide a new and improved zeroing device for bathroom type scales.

Another object of this invention is to provide an improved bathroom scale having the sensing means supported independently of the weight-receiving levers.

Another object is to provide a bathroom scale having a structure for adjusting the position of sensing means relative to weight-receiving levers providing a means for zeroing the scale.

A further object is to provide a simplified and economical structure for moving a bathroom scale indicator to a zero position.

Other features, objects and advantages of the present invention will be obvious from the following description of the preferred embodiment illustrated in the accompanying drawings in which:

FIGURE 1 is a top plan view of a bathroom type scale having the invention therein;

FIGURE 2 is a fragmentary plan view of the scale with the top and levers removed and showing the support mechanism for the weight indicating means;

FIGURE 3 is an enlarged fragmentary sectional view of the scale taken substantially as indicated along line 3—3 of FIGURE 2 illustrating the lever counterbalancing means and associated sensing means parts;

FIGURE 4 is a fragmentary sectional view of the scale taken substantially as indicated along line 4—4 of FIGURE 2;

FIGURE 5 is a fragmentary elevational sectional view of the right hand end of the support shown in FIGURE 2;

FIGURE 6 is an enlarged plan view of the scale with the upper platform and indicating dial removed; and FIGURE 7 is a fragmentary sectional view of a modified form of support showing a variation of the indicating mechanism adjustment support.

Referring now to the drawings and more particularly to FIGURES 1 and 6, there is shown a preferred embodiment of the present invention as employed in a bathroom scale of the platform type. Generally speaking, the scale is provided with a base supporting a pair of cooperating weight-receiving levers. A decorative cover or platform fits telescopically over the base and is supported by the levers. A weight indicating mechanism is provided which is responsive to the deflection of the levers and carries a dial which may be viewed through an opening in the cover as it passes a stationary datum line to indicate the amount of weight placed on the platform. The present invention is concerned with a new and improved zeroing device to bring the dial to a visible reading of zero with no weight on the platform.

In particular, the parts referred to above comprise a base, generally indicated at 10 (FIG. 3) formed as a stamped sheet metal member having an upstanding peripheral edge 11 entirely around the base. The shape of the base may be chosen to make a particular aesthetic appearance of the scale but is in the present instance, as illustrated in FIGURE 1, generally rectangular. The sheet metal base is adapted to rest directly upon a floor or floor covering and support the mechanism of the scale therein. The mechanism support takes the form of upstanding posts or projections 12 generally located in the four corner portions of the base. Each post 12 has a V-shaped section for knife edged cradling of the end of a lever. The posts may be attached to the base by ears 13 secured directly to the metal of the base with suitable fasteners or as by spot welding (FIG. 6).

The weight sensing mechanism of the present scale consists of a pair of levers arranged in overlapping fashion and resting upon the upstanding posts at the corners of the base. A T-shaped lever, generally shown at 14, is formed of two sections, 15 and 16, secured together to form a one piece member for all purposes. Section 15 forming the cross piece of the T has rear edge corner portions 17 constructed to provide knife edges to pivotally rest in the V section of a pair of upstanding posts at one end of the base and longitudinally extending section 16 is channel-shaped having downwardly turned sides of slightly diminishing depth for the counterbalanced supported end 18 of the lever. A generally V-shaped lever 19 is positioned above the T-shaped lever 14 and has end portions 20 constructed to provide knife edges to pivotally rest in the V-section of another set of upstanding posts at the front or head of the base. The apex of the V-shaped lever 19 has a downwardly extending boss 21, which pivotally engages and rests upon an intermediate portion of the channel-shaped section 16 of the T-shaped lever.

A platform 22 for the scale is provided with four depending legs (not shown) each having a V-shaped end adapted to rest on knife-edged metal hangers 23 supported on the edge 24 of an opening provided in the levers for such purpose. The platform 22 has a depending skirt 25 (FIG. 3) at its periphery which extends over the base 10 hiding most of it from view. The platform provides a weight-receiving surface upon which a person may stand. The weight is transferred by the hangers 23 to the levers causing the levers to pivot toward the base. A lens 26 is carried in the flat surface portion of the platform through which a weight indicating dial 27 may be viewed. The weight sensed may be read as that amount shown on the dial under an indicia marker 28 carried on the platform.

The weight indicating mechanism is mounted on a channel support 29 (FIG. 2) adjustably secured to the base at a position generally centrally located between the upstanding posts. The mechanism includes a weight indicating dial 27 supported upon a disc 30 turned by a shaft 31 which is part of and rotated by a pinion gear 32. The pinion gear 32 is turned by a substantially horizontally extending rack 33 which is pivotally secured to a bell crank lever 34. The bell crank 34 comprises a generally U-shaped bracket pivotally supported on a rod 35 extending transversely through the bell crank sides and pivotally journaled on the upstanding sides 36 of the channel support for the indicating mechanism 29. A bar 37 is secured to the outermost end of the bell crank and is arranged to engage the upper side of an upstanding ear 38 on the lever 16 so as to move downwardly with and in response to a lever deflection. The rack 33 is pivotally connected at 40 to the lower end of the bell crank to move with movement of the levers and bell crank and is held in engagement with pinion 32 by means of a spring 41 connected at 42 to the channel support 29 for the indicating mechanism and connected at 43 to the rack. As shown in FIGURE 3 the bell crank movement will be in a clockwise direction when the levers are deflected downwardly by weight on the scale.

A coiled compression spring 39, disposed vertically between the base 10 and the counterbalanced end 18 of the primary levers, accurately counterbalances the weight receiving levers. The end portion 18 of the lever 16 is formed so that the coils of the spring 39 may be threaded into the lever permitting accurate factory calibration of each spring to its particular levers, platform, pivot points, etc.

The upstanding ear 38 is integral with the lever 16 and forms a bearing under the cross bar 37 on the upper end of the bell crank assuring that deflection of the levers allows movement of the bell crank and indicating mechanism therewith. Thus the levers and spring 39 are mounted in the scale independently of the indicating mechanism. The only connection between the two is the abutting contact of the upstanding ear 38 with the cross bar 37.

The bottom of the coil spring 39 is seated upon a triangularly shaped block 44 having diverging upper surfaces 45 and 46 which extend upwardly into the interspace of the coil spring engaging the coils at opposite points, thereby preventing the collapse of the coils of the spring upon themselves during compression to affect the effective length of the spring. The calibration of the scale, once accomplished, will remain accurate throughout the useful life of the scale.

The present invention is concerned primarily with novel structure in the scale for moving the indicating mechanism support relative to the base and weight sensing means. As shown in FIGURES 2 and 4, the indicating mechanism support 29 extends substantially the entire length of the scale, the back end of the support being connected to the base 10 by rivet 47. At the other end of the indicating mechanism support, screw 48 is threadably received into base 10 and supports the upper channel section 49 of the indicating mechanism support. Spring 50 surrounds screw 48 and pushes against base 10 at one end and threaded portion 51 of the support acting as a nut to receive the screw 48. This arrangement insures that the support moves when screw 48 is turned and prevents accidental adjustment of the zeroing device. When screw 48 is turned the entire indicating mechanism is moved vertically in the scale so that the pivotal bell crank support is moved up or down relative to the levers, thereby turning the dial and permitting it to be adjusted to zero position relative to the datum line 28. This structure allows the indicating mechanism support to be adjusted in order to move the dial relative to the datum line without in any way touching the compression spring 39 or changing its effective length.

FIGURE 7 shows a variation in the adjusting screw support, whereby bracket 52 is secured to the base 10 to hold the adjusting screw 48. The nylon washer 53 prevents the adjusting knob 54 from scraping the bracket 52. The knob 54 is of such a diameter that it extends past depending skirt 25 and allows simple and easy adjustment of the scale to a zero position.

The foregoing detailed description has been given for clearness of understanding only and no unnecessary limitations should be understood therefrom, for some modification will be obvious to those skilled in the art.

I claim:

1. A platform scale, comprising:

a scale base;

weight sensing mechanism supported on said base including levers pivoted on the base, a weight supporting platform carried on the levers and spring suspension means for the levers providing movement of the levers relative to the base in proportion to the magnitude of weight placed upon the platform;

an indicating mechanism for visually indicating the amount of weight on the platform and a support therefor mounted in the scale base, said indicating mechanism including a movable weight indicator member, mechanical linkage means biased into contact with a movable portion of said weight sensing means so as to be movable in proportion to movement of the latter means and being connected to the movable indicator member to cause movement thereof in like proportion, said scale carrying a datum adjacent said movable indicator member, said datum and indicator member together providing visible indication of weight on the platform, and means for adjusting the position of said indicating mechanism support relative to said scale base and levers whereby such adjustment may move said biased mechanical linkage relative to said levers changing the relative position of the indicator member and datum for adjusting the scale indication to zero with no weight thereon.

2. A platform scale, comprising:

a base, counter balanced levers bearing upon the base and a weight receiving platform supported upon said levers, said platform carrying a datum for use in visual observation of a quantity of indicated weight on the scale;

an indicating mechanism having a rotatable indicator movable past said datum for visual indication of weight measure, a rack and pinion and an associated bell crank with means biasing the same toward the levers for rotating the indicator in response to movement of the levers;

a support for the entirety of said indicating mechanism mounted upon portions of the base independent of and apart from said counterbalanced levers, and means for adjusting the position of the indicating mechanism support relative to the base and levers in a direction to move the rotatable indicator relative to the datum line while the platform and levers are at rest for bringing the dial to a zero reading without weight upon the scale platform.

3. A bathroom platform scale, comprising:

a sheet metal base of generally rectangular configuration;

weight sensing means including interconnected levers bearing upon the base and supporting a weight receiving platform, said platform carrying a datum;

an indicating mechanism including a rotatable indicator for visual indication of weight measure, a pinion supporting the indicator, a rack in mesh with the pinion and an associated bell crank for rotating the indicator in response to the movement of the levers with means biasing the bell crank and rack to follow movement of such levers;

a support member extending over the base and mounting the indicating mechanism, said support member being secured to portions of the base independent of said interconnected levers, and means for manually adjustably elevating and lowering at least one end of the indicating mechanism support member relative to both the base and interconnected levers whereby the entire indicating mechanism may be moved relative to the levers for rotating the indicator relative to the datum for bringing the weight measure indication to a zero reading without weight upon the scale platform.

4. In a platform scale having a base and cooperating levers thereon supporting a platform, means for adjusting a weight indicating mechanism to a zero reading without weight on the platform, comprising:

an elongated weight indicating mechanism support member secured to the base of the scale and having means for adjustably moving the support member relative to said base at at least one end of the support member;

a weight indicating mechanism including a dial supported solely by said support member, means for rotating said dial including linkage biased into contact with said cooperating levers for turning the dial in response to deflection of such levers;

said means for moving the support member including manually movable threaded means engaging said support member and base for raising and lowering said support member to change the position of said biased linkage relative to said base and levers permitting said linkage to move to remain in biased contact with the levers thereby turning the dial without weight deflection of the levers permitting selective adjustment of the dial to a zero reading.

5. A platform scale, comprising:

a base, a weight receiving paltform, counter-balanced levers bearing on said base and supporting said weight receiving platform, an indicating mechanism having a rotatable indicator for visual indication of weight measure, a pivotally mounted bell crank and a connected rack and pinion mounted and biased for rotating the indicator in response to the movement of the levers, a support for the pivot of said bell crank secured to portions of the base independently of said counterbalanced levers, and means for adjustably moving the pivotal support of the bell crank relative to said counterbalanced levers permitting biased pivoting of the bell crank during said adjustment thereby rotating said indicator to a desired indication of weight on the platform.

References Cited in the file of this patent

UNITED STATES PATENTS

| | | |
|---|---|---|
| 1,982,939 | Weber | Dec. 4, 1934 |
| 2,175,024 | Hansen | Oct. 3, 1939 |
| 2,741,473 | Aylor | Apr. 10, 1956 |
| 2,960,329 | Hanssen | Nov. 15, 1960 |
| 3,022,845 | Provi | Feb. 27, 1962 |
| 3,077,941 | Hansen | Feb. 19, 1963 |